US012424131B2

(12) United States Patent
Park et al.

(10) Patent No.: US 12,424,131 B2
(45) Date of Patent: Sep. 23, 2025

(54) MEASUREMENT DEVICE AND MEASUREMENT METHOD THEREOF

(71) Applicants: Samsung Display Co., LTD., Yongin-si (KR); McScience Inc., Suwon-si (KR)

(72) Inventors: Saeron Park, Yongin-si (KR); Dongwook Noh, Yongin-si (KR); Ung Girl Kong, Suwon-si (KR); Seong Ho Yi, Suwon-si (KR)

(73) Assignees: Samsung Display Co., Ltd., Yongin-si (KR); McScience Inc., Suwon-si (KR)

( * ) Notice: Subject to any disclaimer, the term of this patent is extended or adjusted under 35 U.S.C. 154(b) by 0 days.

(21) Appl. No.: 18/424,647

(22) Filed: Jan. 26, 2024

(65) Prior Publication Data

US 2024/0290232 A1 Aug. 29, 2024

(30) Foreign Application Priority Data

Feb. 27, 2023 (KR) ........................ 10-2023-0026351

(51) Int. Cl.
*G09G 3/00* (2006.01)

(52) U.S. Cl.
CPC ....... *G09G 3/006* (2013.01); *G09G 2320/043* (2013.01); *G09G 2330/021* (2013.01); *G09G 2330/12* (2013.01)

(58) Field of Classification Search
CPC ............. G09G 3/006; G09G 2320/043; G09G 2330/12; G09G 2330/021; G02F 1/136254; H10K 71/70; H10K 71/831
USPC .................................................. 345/211–213
See application file for complete search history.

(56) References Cited

U.S. PATENT DOCUMENTS

| | | | | |
|---|---|---|---|---|
| 2008/0055211 A1* | 3/2008 | Ogawa | G09G 3/3225 | 345/77 |
| 2011/0309830 A1* | 12/2011 | Teng | G01R 19/16547 | 702/62 |
| 2020/0219447 A1* | 7/2020 | Talebzadeh | G09G 3/3258 | |
| 2023/0215351 A1* | 7/2023 | Kim | G09G 3/3696 | 345/204 |

FOREIGN PATENT DOCUMENTS

| | | |
|---|---|---|
| KR | 10-1079900 | 11/2011 |
| KR | 10-2018-0045747 | 5/2018 |
| KR | 10-2051640 | 12/2019 |

* cited by examiner

*Primary Examiner* — Stephen G Sherman
(74) *Attorney, Agent, or Firm* — Womble Bond Dickinson (US) LLP

(57) ABSTRACT

A measurement device includes a power supplier including a first terminal through which a first power voltage is output and a second terminal through which a second power voltage is output, the power supplier being configured to receive a first current from the first terminal to measure a power current of a display device and to receive a second current from the second terminal to measure a luminance of the display device; a switching circuit including a first switch configured to selectively connect a power terminal of the display device to the first terminal or an internal voltage terminal of the display device through which an internal voltage of the display device is output; and a luminance sensing circuit configured to receive the second power voltage and to generate the second current corresponding to the luminance of the display device.

9 Claims, 14 Drawing Sheets

MEASUREMENT DEVICE AND MEASUREMENT METHOD THEREOF

CROSS-REFERENCE TO RELATED APPLICATION

The present application claims priority to and the benefit of Korean Patent Application No. 10-2023-0026351, filed on Feb. 27, 2023, in the Korean Intellectual Property Office, the entire disclosure of which is incorporated herein by reference.

BACKGROUND

1. Field

Aspects of embodiments of the present disclosure relate to a measurement device and a measurement method thereof.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

As the driving time of the display device increases, pixels (or light emitting elements included in the pixels) may gradually deteriorate. When pixels are deteriorated, the display device may display an image with a non-uniform luminance. Therefore, to compensate for a variation in a luminance caused by the deterioration of the pixels, measurement of the variation in the characteristic caused by the deterioration of the pixels may be required.

However, a measurement device of the related art may measure only the luminance of the display device through a photodiode or the like, and may not measure a voltage-current characteristic of the display device. In addition, in order to measure the voltage-current characteristic, an additional power supply device may be required. However, use of the power supply device may increase complexity and a cost of equipment for measurement, and require a user to manually operate a measuring device and the power supply device so as to perform the measurement.

More particularly, embodiments of the present disclosure relate to a measurement device and a measurement method thereof, capable of measuring characteristics of a display device.

SUMMARY

Aspects of embodiments of the present disclosure are directed to a measurement device capable of measuring a luminance and a power current of a display device.

Aspects of embodiments of the present disclosure are directed to provide a measurement method of the measurement device, in which the measurement device measures characteristics of a display device.

However, the object aspects of the present disclosure are not limited thereto.

According to some embodiments of the present disclosure, there is provided a measurement device including: a power supplier including a first terminal through which a first power voltage is output and a second terminal through which a second power voltage is output, the power supplier being configured to receive a first current from the first terminal to measure a power current of a display device and to receive a second current from the second terminal to measure a luminance of the display device; a switching circuit including a first switch configured to selectively connect a power terminal of the display device to the first terminal or an internal voltage terminal of the display device through which an internal voltage of the display device is output; and a luminance sensing circuit configured to receive the second power voltage and to generate the second current corresponding to the luminance of the display device.

In some embodiments, the first switch is configured to connect the power terminal to the first terminal in a first measurement period in which the power current is measured.

In some embodiments, the power supplier is configured to vary the first power voltage and to measure the power current according to the first power voltage.

In some embodiments, the first switch is configured to connect the power terminal to the internal voltage terminal in a second measurement period in which the luminance is measured.

In some embodiments, the power supplier is configured to measure the power current in a first measurement period and to measure the luminance in a second measurement period, the first measurement period is repeated at first measurement intervals, and the second measurement period is repeated at second measurement intervals, each of the second measurement intervals being shorter than each of the first measurement intervals.

In some embodiments, the first switch includes a reed switch.

In some embodiments, the luminance sensing circuit includes: a first luminance sensor configured to generate the second current corresponding to a luminance of a first display region of the display device; and a second luminance sensor configured to generate the second current corresponding to a luminance of a second display region of the display device, which is different from the first display region of the display device.

In some embodiments, the switching circuit further includes: a second switch configured to connect the second terminal to the first luminance sensor; and a third switch configured to connect the second terminal to the second luminance sensor.

In some embodiments, each of the second and third switches includes a reed switch.

In some embodiments, power supplier includes: a control circuit configured to generate an initial power voltage; a power amplifier configured to receive a sum of the initial power voltage and a feedback voltage and to output the first power voltage; a current meter configured to measure the power current; a voltage meter configured to measure the first power voltage at the first terminal; a luminance meter configured to measure the luminance; and a feedback controller configured to generate the feedback voltage based on the initial power voltage and the first power voltage.

According to some embodiments of the present disclosure, there is provided a measurement method of a measurement device, the measurement method including: displaying a deterioration pattern on a display device; providing a first power voltage to the display device in a first measurement period; measuring a power current of the display device in the first measurement period; providing an internal voltage of the display device to the display device in a second measurement period; and measuring a luminance of the display device in the second measurement period.

In some embodiments, the measurement method further includes: measuring an initial power current of the display device before the displaying of the deterioration pattern; and measuring an initial luminance of the display device before the displaying of the deterioration pattern.

In some embodiments, the deterioration pattern includes a first region in which light is emitted and a second region in which light is not emitted.

In some embodiments, the measuring of the luminance includes: measuring a luminance of a first display region of the display device, the first display region corresponding to the first region; and measuring a luminance of a second display region of the display device, the second display region corresponding to the second region.

In some embodiments, the measurement method further includes: measuring a variation in the luminance as a function of deterioration time based on the luminance of the first display region and the luminance of the second display region.

In some embodiments, the first power voltage is measured in the first measurement period.

In some embodiments, the measurement method further includes: measuring a voltage-current characteristic as a function of deterioration time based on the first power voltage and the power current.

In some embodiments, the luminance is measured in the first measurement period.

In some embodiments, the first measurement period is repeated at first measurement intervals, and the second measurement period is repeated at second measurement intervals, each of the second measurement intervals being shorter than each of the first measurement intervals.

DETAILED DESCRIPTION

Hereinafter, embodiments of the present disclosure will be explained in detail with reference to the accompanying drawings.

Figure 1:
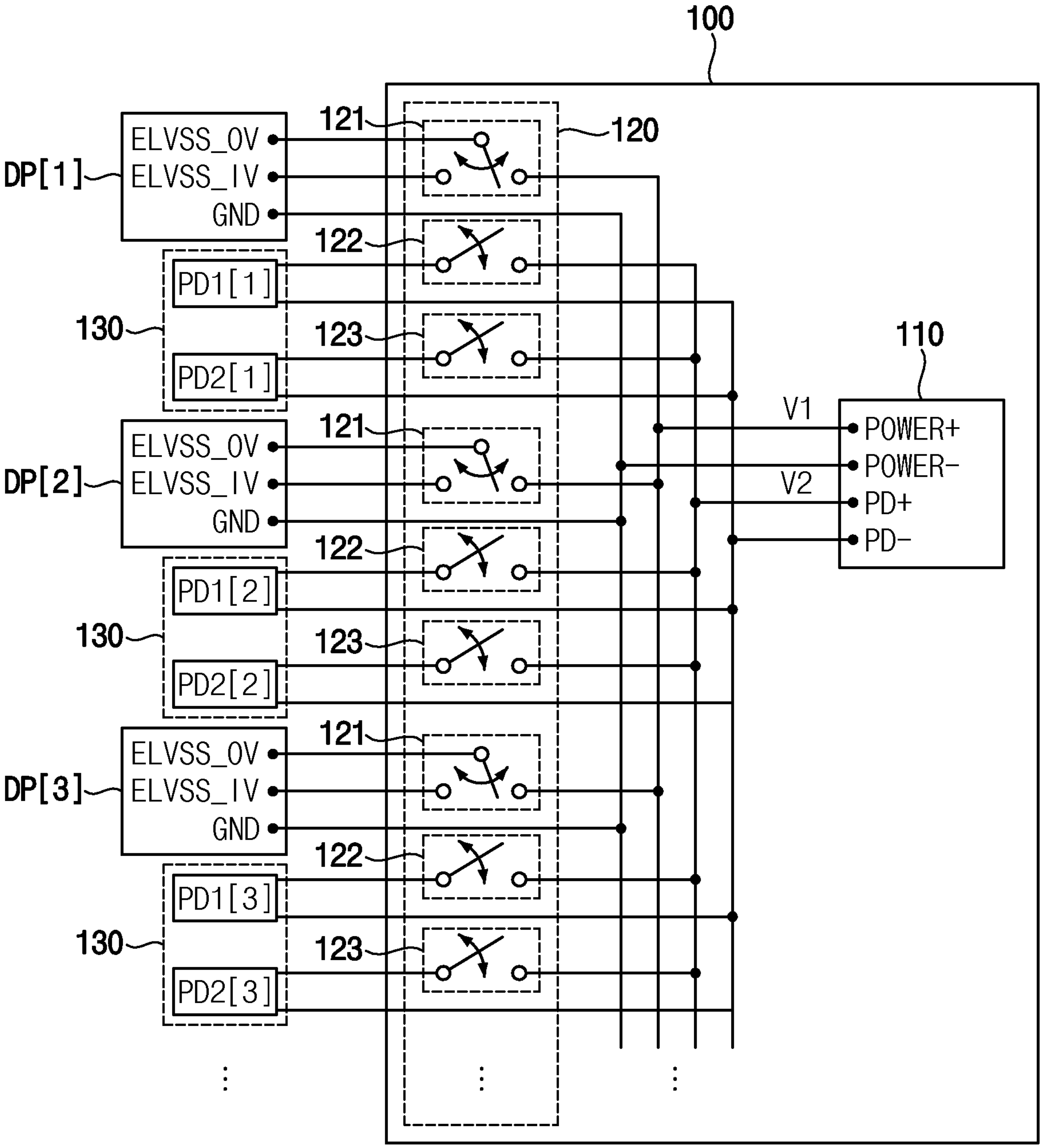
FIG. 1 is a diagram illustrating a measurement device according to some embodiments of the present disclosure.

FIG. 1 is a diagram illustrating a measurement device according to some embodiments of the present disclosure.

Referring to FIG. 1, a measurement device may include a power supply device 100 and a luminance sensing circuit (or a luminance sensing unit) 130. The power supply device 100 may include a power supplier 110 and a switching circuit (e.g., a switch unit) 120.

The power supplier 110 may include a first terminal POWER+ through which a first power voltage V1 is output, and a second terminal PD+ through which a second power voltage V2 is output. The power supplier 110 may include a third terminal POWER− connected to a ground terminal GND of each of the display devices DP[1], DP[2], and DP[3]. The power supplier 110 may include a fourth terminal PD− connected to a ground terminal of each of the luminance sensors PD1[1], PD1[2], PD1[3], PD2[1], PD2[2], and PD2[3]. For example, the third terminal POWER− and the fourth terminal PD− may be grounded (may be at ground reference voltage).

A voltage applied to a power terminal ELVSS_OV may be used as a power voltage of each of the display devices DP[1], DP[2], and DP[3]. The power voltage of each of the display devices DP[1], DP[2], and DP[3] may be a voltage for driving pixels of each of the display devices DP[1], DP[2], and DP[3]. For example, each of the pixels may receive the power voltage to generate a driving current, and a light emitting device of each of the pixels may emit a light with a luminance corresponding to (e.g., proportional to) the driving current. A second power voltage V2 may be a voltage for driving (e.g., powering) the luminance sensors PD1[1], PD1[2], PD1[3], PD2[1], PD2[2], and PD2[3].

The switching circuit 120 may include a first switch 121 configured to selectively connect the power terminals ELVSS_OV of the display devices DP[1], DP[2], and DP[3] to the first terminal POWER+ or to the internal voltage terminals ELVSS_IV of the display devices DP[1], DP[2], and DP[3] through which internal voltages of the display devices DP[1], DP[2], and DP[3] are output, respectively.

The internal voltage may be a voltage generated inside each of the display devices DP[1], DP[2], and DP[3]. To measure a variation in luminance as a function of deterioration time of each of the display devices DP[1], DP[2], and DP[3], each of the display devices DP[1], DP[2], and DP[3] may display a measurement pattern by using the internal voltage in a second measurement period that will be described below. According to some embodiments, each of the display devices DP[1], DP[2], and DP[3] uses the internal voltage when a deterioration pattern that will be described below is displayed.

For example, the first switch 121 may be a reed switch. Accordingly, the first switch 121 may have a low resistance, and exhibit low noise and low interference.

The power supplier 110 may receive a first current from the first terminal POWER+ to measure a power current of each of the display devices DP[1], DP[2], and DP[3]. The first switch 121 may connect the power terminal ELVSS_OV to the first terminal POWER+ in a first measurement period in which the power current is measured.

For example, in the first measurement period in which a first display device DP[1] is subjected to measurement, the first terminal POWER+ may be connected to the power terminal ELVSS_OV of the first display device DP[1]. The first power voltage V1 may be applied to the first display device DP[1]. The first display device DP[1] may display a measurement pattern. Because the first display device DP[1] displays an image, the power current may flow through a line to which the first power voltage V1 is applied. In addition, the power supplier 110 may measure the power current by measuring a current of the first terminal POWER+.

For example, the measurement pattern may be at least one of a full white image, a full red image, a full blue image, and a full green image. For example, the measurement pattern may be an image obtained by varying a luminance of at least one of a full white image, a full red image, a full blue image, and a full green image. When the measurement device measures the power current for a plurality of measurement patterns, the measurement device may measure a plurality of voltage-current characteristics for the measurement patterns. Display of the same measurement pattern may not be necessarily required in the first measurement period and the second measurement period, which will be described below.

The power supplier 110 may measure the first power voltage V1 in the first measurement period. For example, the power supplier 110 may measure the first power voltage V1 of the first terminal POWER+. The power supplier 110 may vary the first power voltage V1, and measure the power current according to the first power voltage V1. Accordingly, the power supplier 110 may measure a voltage-current characteristic of each of the display devices DP[1], DP[2], and DP[3].

According to some embodiments, the power supplier 110 measures a luminance of each of the display devices DP[1], DP[2], and DP[3] in the first measurement period. For example, the power supplier 110 may receive a current of the second terminal PD+ to measure the luminance of the display device in the first measurement period. The measurement of the luminance in the first measurement period may be substantially the same as the measurement of the luminance in the second measurement period, which will be described below, except for the first switch 121.

The luminance sensing circuit 130 may receive the second power voltage V2, and generate a second current corresponding to the luminance of each of the display devices DP[1], DP[2], and DP[3]. The luminance sensing circuit 130 may include: first luminance sensors PD1[1], PD1[2], and PD1[3] configured to generate the second currents corresponding to luminosities of first display regions of the display devices DP[1], DP[2], and DP[3], respectively; and second luminance sensors PD2[1], PD2[2], and PD2[3] configured to generate the second currents corresponding to luminosities of second display regions of the display devices DP[1], DP[2], and DP[3], which are different from the first display regions of the display devices DP[1], DP[2], and DP[3], respectively.

The switching circuit 120 may further include: a second switch 122 configured to connect the second terminal PD+ to each of the first luminance sensors PD1[1], PD1[2], and PD1[3]; and a third switch 123 configured to connect the second terminal PD+ to each of the second luminance sensors PD2[1], PD2[2], and PD2[3].

For example, each of the second switch 122 and the third switch 123 may be a reed switch. Accordingly, each of the second switch 122 and the third switch 123 may have a low resistance, a low noise, and a low interference.

The power supplier 110 may receive the second current from the second terminal PD+ to measure the luminance of each of the display devices DP[1], DP[2], and DP[3]. The first switch 121 may connect the power terminal ELVSS_OV to the internal voltage terminal ELVSS_IV in the second measurement period in which the luminance of each of the display devices DP[1], DP[2], and DP[3] is measured by using the internal voltage of the corresponding display device.

For example, in the second measurement period in which the luminance of the first display device DP[1] is measured by using the internal voltage, the internal voltage terminal ELVSS_IV may be connected to the power terminal ELVSS_OV of the first display device DP[1]. The internal voltage may be applied to the first display device DP[1]. The first display device DP[1] may display a measurement pattern. The first luminance sensor PD1[1] for the first display device DP[1] may generate the second current corresponding to the luminance of the first display region of the first display device DP[1]. The power supplier 110 may measure the luminance of the first display region of the first display device DP[1] based on the second current corresponding to the luminance of the first display region of the first display device DP[1]. The second luminance sensor PD2[1] for the first display device DP[1] may generate the second current corresponding to the luminance of the second display region of the first display device DP[1]. The power supplier 110 may measure the luminance of the second display region of the first display device DP[1] based on the second current corresponding to the luminance of the second display region of the first display device DP[1].

For example, each of the first luminance sensors PD1[1], PD1[2], and PD1[3] and the second luminance sensors PD2[1], PD2[2], and PD2[3] may be a photodiode.

For example, the measurement pattern may be at least one of a full white image, a full red image, a full blue image, and a full green image. For example, the measurement pattern may be an image obtained by varying a luminance of at least one of a full white image, a full red image, a full blue image, and a full green image. When the measurement device measures the luminance for a plurality of measurement patterns, the measurement device may measure a plurality of variations in luminosities for the different measurement patterns.

The measurement device may sequentially (e.g., serially) perform measurement on the display devices DP[1], DP[2], and DP[3]. For example, the measurement device may measure the power current of a second display device DP[2] after measuring the power current of the first display device DP[1]. For example, the measurement device may measure the power current of a third display device DP[3] after measuring the power current of the second display device DP[2]. For example, the measurement device may measure the luminance of the second display device DP[2] after measuring the luminance of the first display device DP[1]. For example, the measurement device may measure the luminance of the third display device DP[3] after measuring the luminance of the second display device DP[2].

Because the measurement device sequentially (e.g., serially) performs measurement on the display devices DP[1], DP[2], and DP[3], a current noise that may be generated when a plurality of display devices DP[1], DP[2], and DP[3] are concurrently (e.g., simultaneously) subjected to the measurement through one power supplier 110 may be reduced (e.g., minimized).

According to the measurement device, because the power supply device 100 of the measurement device includes the switching circuit 120, characteristics of the display devices DP[1], DP[2], and DP[3] may be automatically measured. In addition, because the measurement device automatically performs the measurement on the display devices DP[1], DP[2], and DP[3], measurement may be performed on a plurality of display devices DP[1], DP[2], and DP[3] concurrently (e.g., at once). In addition, because the measurement device includes the power supplier 110 and the switching circuit 120, complexity and cost of equipment for measurement may be reduced.

The measurement device may measure characteristics (e.g., a variation in a luminance and a voltage-current characteristic as a function of deterioration time) of a plurality of display devices DP[1], DP[2], and DP[3], so that statistical evaluation may be performed on measurement results of the display devices DP[1], DP[2], and DP[3]. Accordingly, measurement accuracy of the characteristics of the display devices DP[1], DP[2], and DP[3] may be improved (e.g., increased).

As described above, the measurement device may measure the luminance and the power current of each of the display devices DP[1], DP[2], and DP[3]. Accordingly, the measurement device may measure the variation in the luminance and the voltage-current characteristic according to the deterioration time.

Accordingly, a deterioration margin, which is the basis for determining the power voltage of the display device, may be accurately determined. Therefore, each of the display devices DP[1], DP[2], and DP[3] may use a low power voltage and have reduced power consumption as compared with a case where the deterioration margin is collectively determined. In addition, a decrease in the luminance, which occurs as the display devices DP[1], DP[2], and DP[3] are driven, may be accurately compensated for.

The measured variation in the luminance and the measured voltage-current characteristic according to the deterioration time may also be applied to display devices DP[1], DP[2], and DP[3] manufactured through similar processes as well as the display devices DP[1], DP[2], and DP[3] that have been subjected to the measurement.

Although three display devices DP[1], DP[2], and DP[3] have been illustrated in the present embodiments, the present disclosure is not limited to the number of display devices DP[1], DP[2], and DP[3] that are subjected to measurement by the measurement device, and the measurement device may be configured to concurrently test any suitable number of display devices.

Figure 2:
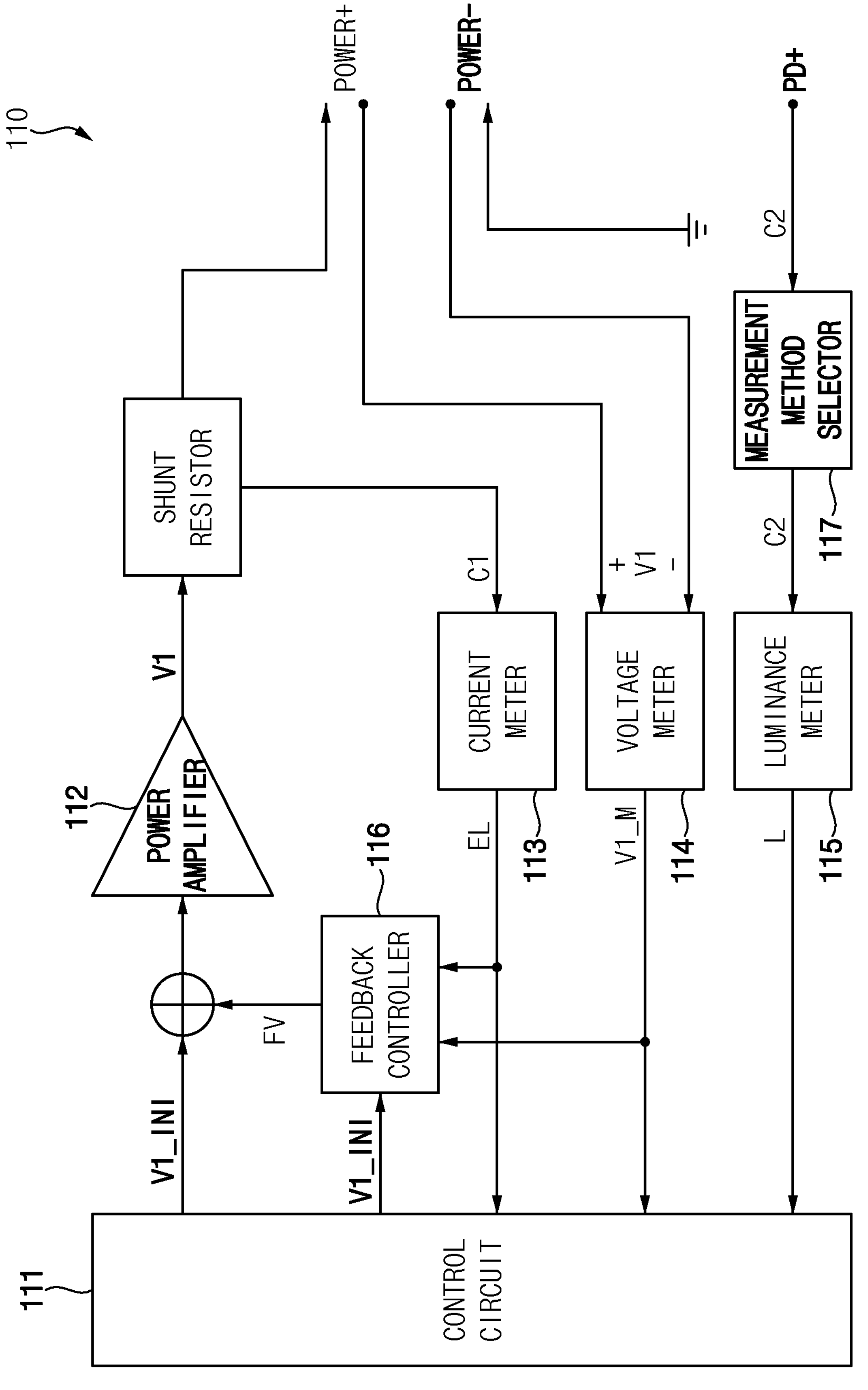
FIG. 2 is a diagram illustrating an example of a power supplier of FIG. 1, according to some embodiments of the present disclosure.

FIG. 2 is a diagram illustrating an example of a power supplier 110 of FIG. 1, according to some embodiments of the present disclosure.

In FIG. 2, configurations for generating the second power voltage V2 have been omitted for convenience of description.

Referring to FIGS. 1 and 2, the power supplier 110 may include a control circuit 111, power amplifier 112, a current meter 113, a voltage meter 114, a luminance meter 115, a feedback controller 116, a measurement method selector 117, and a shunt resistor.

The control circuit 111 may generate an initial power voltage V1_INI. The control circuit 111 may provide the initial power voltage V1_INI to the power amplifier 112. The power amplifier 112 may receive a sum of the initial power voltage V1_INI and a feedback voltage FV, and output the first power voltage V1.

The control circuit 111 may provide the initial power voltage V1_INI to the feedback controller 116. The feedback controller 116 may generate the feedback voltage FV based on the initial power voltage V1_INI and the first power voltage V1_M measured by the voltage meter 114.

For example, the initial power voltage V1_INI may have a voltage value corresponding to an initially intended voltage value of the first power voltage V1. However, the first power voltage V1 output from the power supplier 110 may have a voltage value that is different from the initially intended voltage value. In this case, the feedback controller 116 may compare the initial power voltage V1_INI with the first power voltage V1_M measured by the voltage meter 114 to generate the feedback voltage FV for compensating for the initial power voltage V1_INI.

Although the power supplier 110 has been illustrated according to some embodiments as outputting a constant voltage, the measurement device according to the present disclosure is not limited thereto. For example, the power supplier 110 may output a constant current. In this case, the control circuit 111 may output an initial power current, the feedback controller 116 may compare the initial power current with a measured power current EL to generate a feedback current, and the power supplier 110 may output a constant current based on a sum of the initial power current and the feedback current.

The current meter 113 may receive a first current C1 to measure a power current EL. The current meter 113 may be connected to the shunt resistor. The current meter 113 may provide the measured power current EL to the control circuit 111 and the feedback controller 116.

The voltage meter 114 may measure the first power voltage V1 at the first terminal POWER+. The voltage meter 114 may be connected to the first terminal POWER+ and the third terminal POWER−. The third terminal POWER− may be grounded. Accordingly, the voltage meter 114 may measure the first power voltage V1 at the first terminal POWER+. The voltage meter 114 may provide the measured first power voltage V1_M to the control circuit 111 and the feedback controller 116.

The luminance meter 115 may receive a second current C2 to measure a luminance L. The luminance meter 115 may provide the measured luminance L to the control circuit 111.

The measurement method selector 117 may determine a scheme in which the luminance meter 115 measures the luminance L. The luminance meter 115 may measure the luminance L in one of a current scheme or a voltage scheme by the measurement method selector 117.

For example, the luminance meter 115 may determine (e.g., measure) the luminance L by measuring the second current C2 (i.e., the current scheme). For example, the luminance meter 115 may determine (e.g., measure) the luminance L by measuring a voltage across a resistor element through which the second current C2 passes (i.e., the voltage scheme).

Figure 3:
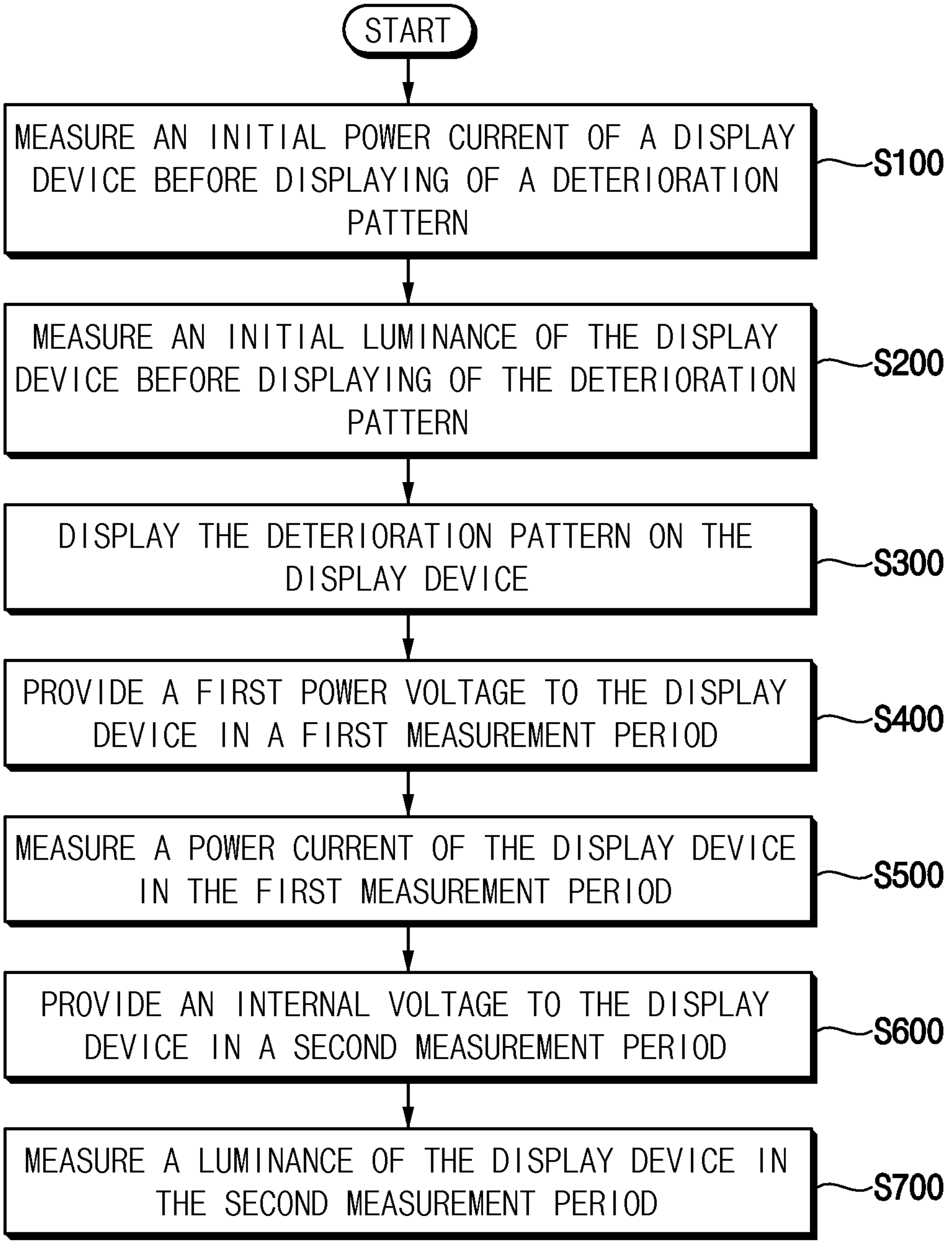
FIG. 3 is a flowchart illustrating a measurement method of a measurement device according to some embodiments of the present disclosure.

FIG. 3 is a flowchart illustrating a measurement method of a measurement device according to some embodiments of the present disclosure.

Referring to FIG. 3, a measurement method of a measurement device may include: displaying a deterioration pattern on a display device (S300); providing a first power voltage to the display device in a first measurement period (S400); measuring a power current of the display device in the first measurement period (S500); providing an internal voltage of the display device to the display device in a second measurement period (S600); and measuring a luminance of the display device in the second measurement period (S700).

The measurement method of the measurement device, as illustrated in FIG. 3, may further include: measuring an initial power current of the display device before display of the deterioration pattern (S100); and measuring an initial luminance of the display device before displaying the deterioration pattern (S200).

According to some embodiments, the first power voltage is measured in the first measurement period. According to the measurement method of the measurement device, as illustrated in FIG. 3, a voltage-current characteristic as a function of deterioration time may be measured based on the measured first power voltage and the measured power current.

According to some embodiments, the luminance is measured in the first measurement period. According to the measurement method of the measurement device illustrated in FIG. 3, the luminance may be measured in the first measurement period as well as the second measurement period so that a variation in luminance as a function of deterioration time may be measured for the first power voltage as well as the internal voltage, and a variation in a luminance according to the first power voltage may be measured.

Figure 4:
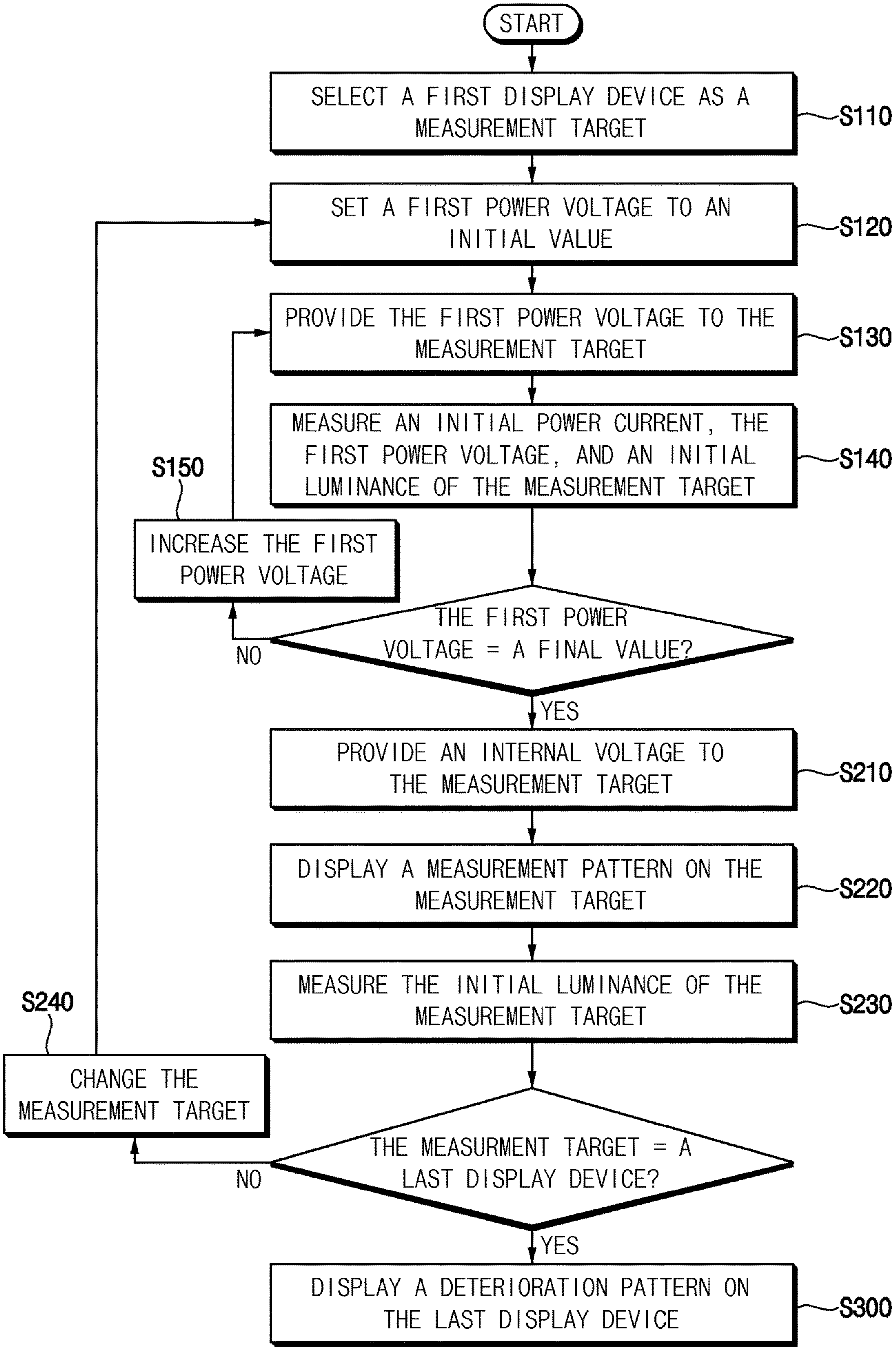
FIG. 4 is a flowchart illustrating an example of measurement of an initial power current and an initial luminance according to the measurement method of the measurement device of FIG. 3, according to some embodiments of the present disclosure.

FIG. 4 is a flowchart illustrating an example of measurement of an initial power current and an initial luminance according to the measurement method of the measurement device of FIG. 3, according to some embodiments of the present disclosure.

Referring to FIGS. 1 and 4, the measurement method of the measurement device, as illustrated in FIG. 3, may include: selecting a first display device DP[1] as a measurement target (S110); setting the first power voltage V1 to an initial value (S120); providing the first power voltage V1 to the display device that is the measurement target (S130); measuring the initial power current, the first power voltage, and the initial luminance of the display device that is the measurement target (S140); increasing, when the first power voltage V1 does not have (e.g., is not equal to) a final value, the first power voltage V1, providing the first power voltage V1 to the display device that is the measurement target again, and measuring the initial power current, the first power voltage, and the initial luminance of the display device that is the measurement target (S150), and returning to providing the first power voltage to the measurement target as described above; providing, when the first power voltage V1 has (e.g., is equal to) the final value, the internal voltage of the display device that is the measurement target to the display device that is the measurement target (S210); displaying a measurement pattern on the display device that is the measurement target (S220); measuring the initial luminance of the display device that is the measurement target (S230); changing, when the measurement target is not a last display device, the measurement target (S240), and returning to setting the first power voltage to an initial value as described above; and displaying, when the measurement target is the last display device, the deterioration pattern on the display device (S300).

In detail, the measurement method of the measurement device, as illustrated in FIG. 3, may include: setting the first power voltage V1 to an initial value (S120); providing the first power voltage V1 to the display device that is the measurement target (S130); measuring the initial power current, the first power voltage, and the initial luminance of the display device that is the measurement target (S140); and increasing, when the first power voltage V1 does not have a final value, the first power voltage V1, providing the first power voltage V1 to the display device that is the measurement target again, and measuring the initial power current, the first power voltage V1, and the initial luminance of the display device that is the measurement target (S150).

The measurement device may vary the first power voltage V1, and measure the power current according to the first power voltage V1. In other words, the measurement device may measure the initial power current, the first power voltage, and the initial luminance of the display device that is the measurement target while increasing the first power voltage V1 from the initial value to the final value.

According to some embodiments, the initial power current is measured while displaying the measurement pattern on the display devices DP[1], DP[2], and DP[3].

The initial power current may be a power current before the displaying of the deterioration pattern (i.e., before the display devices DP[1], DP[2], and DP[3] deteriorate). The initial luminance may be a luminance before the displaying of the deterioration pattern (i.e., before the display devices DP[1], DP[2], and DP[3] deteriorate).

The initial power current may represent a characteristic of each of the display devices DP[1], DP[2], and DP[3] before the display devices DP[1], DP[2], and DP[3] deteriorate (i.e., when the deterioration time is 0).

Figure 14:
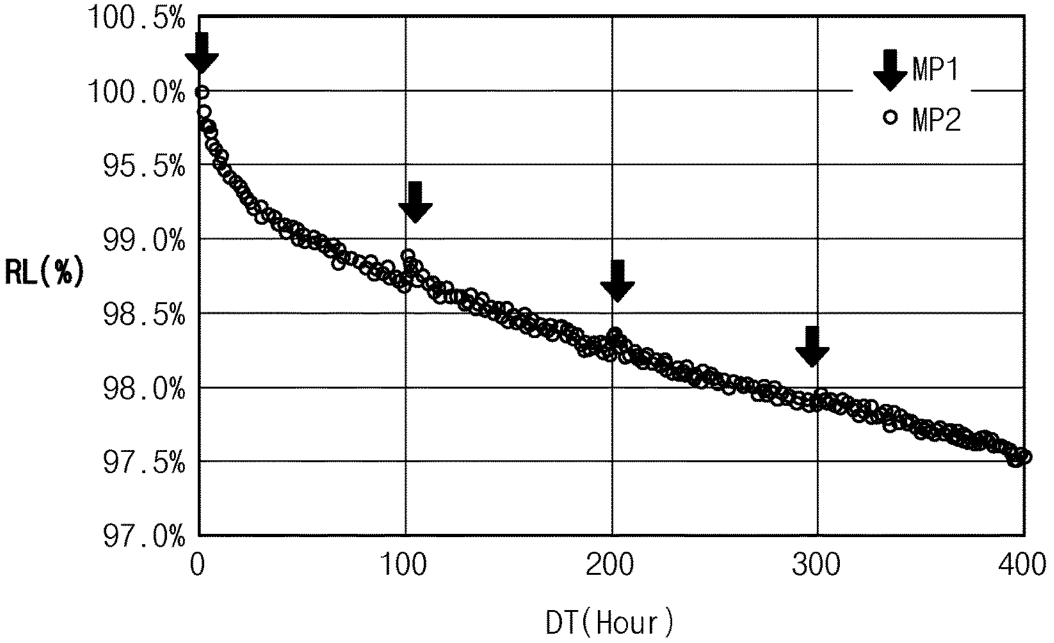
FIG. 14 is a graph illustrating a first measurement period and a second measurement period, according to some embodiments of the present disclosure.

Actions S110, S120, S130, S140, and S150 in FIG. 4 may be substantially the same as actions S410, S420, S430, S510, and S520 in FIG. 6A, which will be described below, except that S110, S120, S130, S140, and S150 in FIG. 4 are performed before the display devices DP[1], DP[2], and DP[3] deteriorate (i.e., when the deterioration time is 0). In other words, as shown in FIG. 14 that will be described below, a period in which the initial power current is measured may be a first measurement period before the displaying of the deterioration pattern.

In detail, the measurement method of the measurement device, as illustrated in FIG. 3, may include: providing the internal voltage of the display device that is the measurement target to the display device that is the measurement target (S210); displaying a measurement pattern on the display device that is the measurement target (S220); and measuring the initial luminance of the display device that is the measurement target (S230). The initial luminance may be a luminance before the displaying of the deterioration pattern (i.e., before the display devices DP[1], DP[2], and DP[3] deteriorate).

The initial luminance may represent a characteristic of each of the display devices DP[1], DP[2], and DP[3]) before the display devices DP[1], DP[2], and DP[3] deteriorate (i.e., when the deterioration time is 0).

Actions S210, S220, and S230 in FIG. 4 may be substantially the same as actions S610, S620, and S710 in FIG. 6A, which will be described below, except that S210, S220, and S230 in FIG. 4 are performed before the display devices DP[1], DP[2], and DP[3] deteriorate (i.e., when the deterioration time is 0). In other words, as shown in FIG. 14 that will be described below, a period in which the initial luminance according to the internal voltage is measured may be a second measurement period before the displaying of the deterioration pattern.

In detail, the measurement method of the measurement device, as illustrated in FIG. 3, may include selecting a first display device DP[1] as a measurement target (S110). The measurement method of the measurement device, as illustrated in FIG. 3, may include: changing, when the measurement target is not a last display device, the measurement target (S240); and displaying, when the measurement target is the last display device, the deterioration pattern on the display device (S300). The measurement device may sequentially (e.g., serially) perform measurement on the display devices DP[1], DP[2], and DP[3]. Therefore, the display devices DP[1], DP[2], and DP[3] may be sequentially (e.g., serially) selected as the measurement target, and the selection may be repeatedly performed until the measurement target becomes the last display device.

Figure 5:
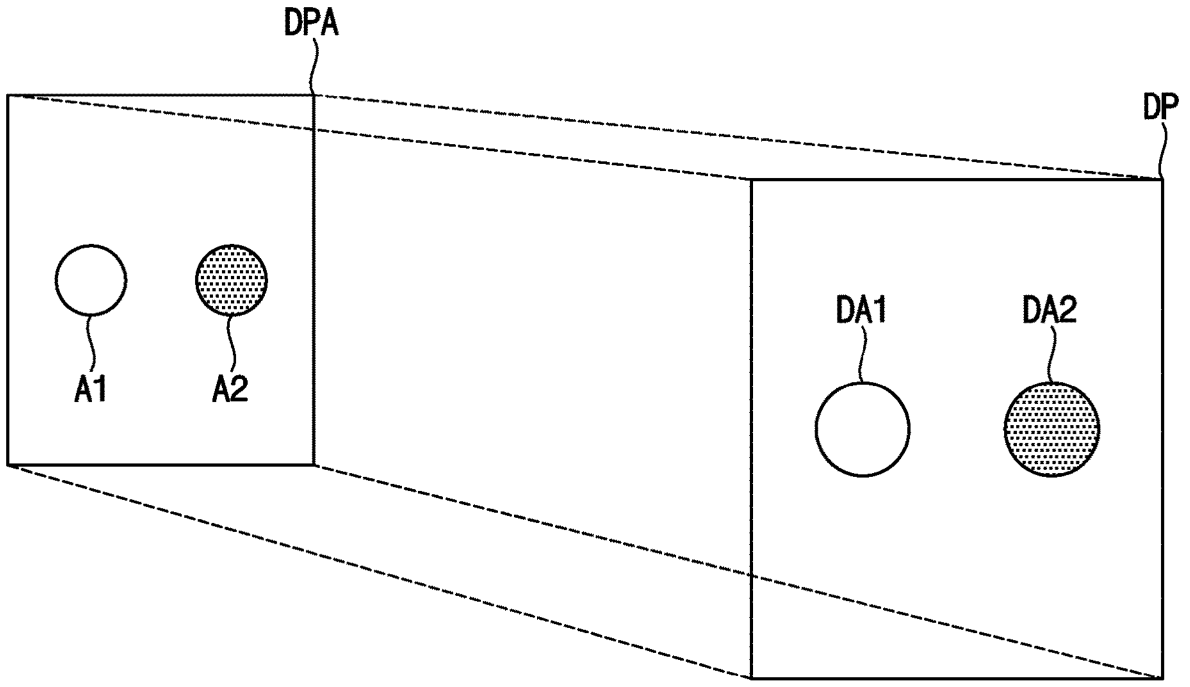
FIG. 5 is a diagram illustrating an example of a deterioration pattern according to the measurement method of the measurement device, as illustrated in FIG. 3, according to some embodiments of the present disclosure.

FIG. 5 is a diagram illustrating an example of a deterioration pattern according to the measurement method of the measurement device, as illustrated in FIG. 3, according to some embodiments of the present disclosure.

Referring to FIGS. 1, 4, and 5, the measurement method of the measurement device, as illustrated in FIG. 3, may include displaying the deterioration pattern DPA on the display device DP (S300).

After all the display devices DP[1], DP[2], and DP[3] are measured before the display devices DP[1], DP[2], and DP[3] deteriorate (i.e., when the deterioration time is 0), the deterioration pattern DPA may be displayed on the display devices DP[1], DP[2], and DP[3]. In other words, to measure the variation in the luminance and the voltage-current characteristic according to the deterioration time, the display devices DP[1], DP[2], and DP[3] may deteriorate due to the deterioration pattern DPA.

The deterioration pattern DPA may include a first region A1 and a second region A2. The first region A1 may be a region in which light is emitted, and the second region A2 may be a region in which light is not emitted. Although some embodiments in which an area of the first region A1 and an area of the second region A2 are equal to each other have been shown in FIG. 5, the present disclosure is not limited thereto, and according to some other embodiments, the area of the first region A1 and the area of the second region A2 may be different from each other. The first luminance sensors PD1[1], PD1[2], and PD1[3] may measure a luminance of a first display region DA1 of the display device DP, which corresponds to the first region A1. The second luminance sensors PD2[1], PD2[2], and PD2[3] may measure a luminance of a second display region DA2 of the display device DP, which corresponds to the second region A2.

The measurement method of the measurement device, as illustrated in FIG. 3, may include measuring a variation in the luminance as a function of deterioration time based on the luminance of the first display region DA1 and the luminance of the second display region DA2. The second display region DA2 may not deteriorate, and the first display region DA1 may deteriorate. Therefore, the measurement device may measure the variation in the luminance according to the deterioration time by comparing the luminance of the first display region DA1 with the luminance of the second display region DA2.

Figure 6A:
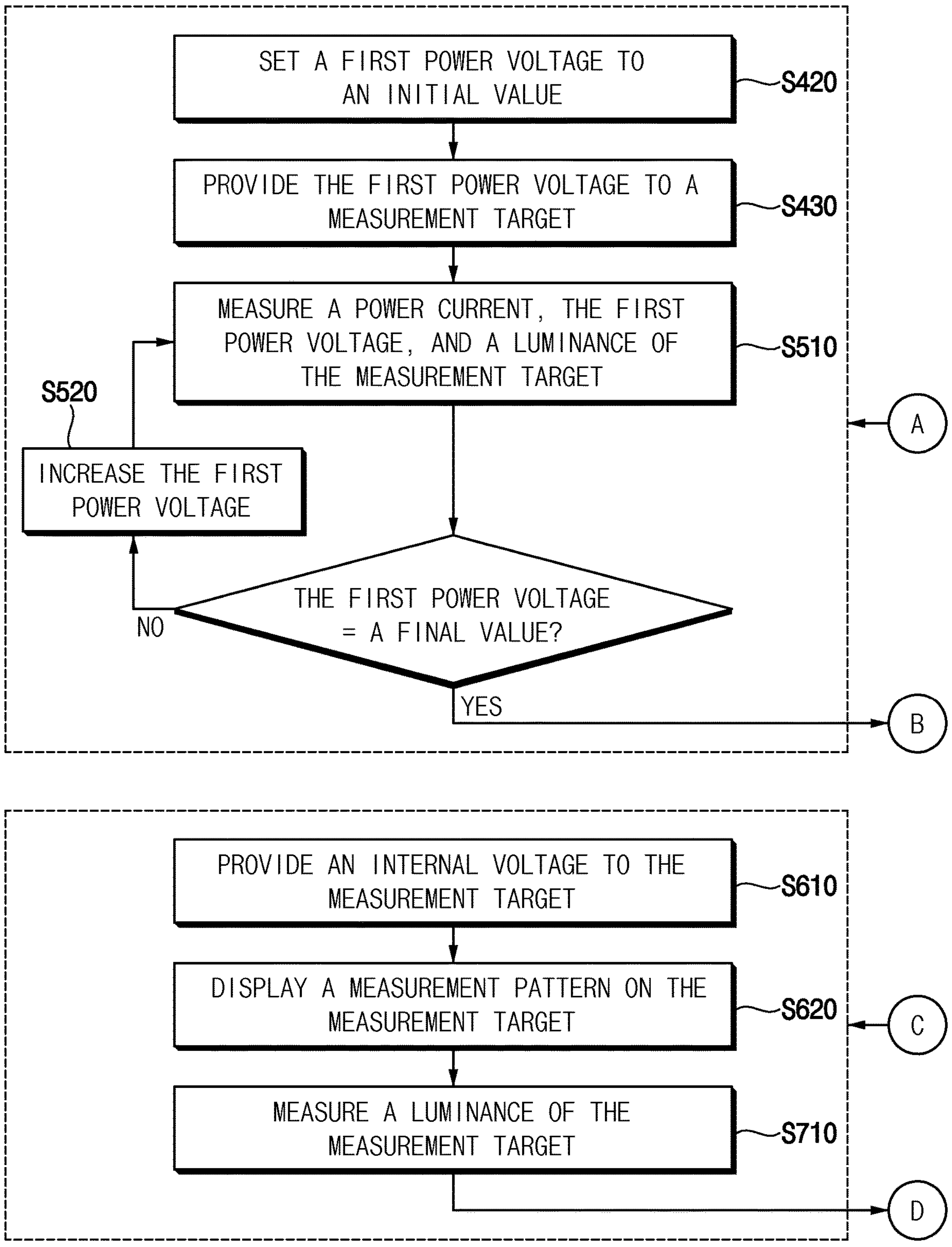
FIGS. 6A and 6B are flowcharts illustrating an example of measurement of a power current and a luminance according to the measurement method of the measurement device of FIG. 3, according to some embodiments of the present disclosure.
Figure 6B:
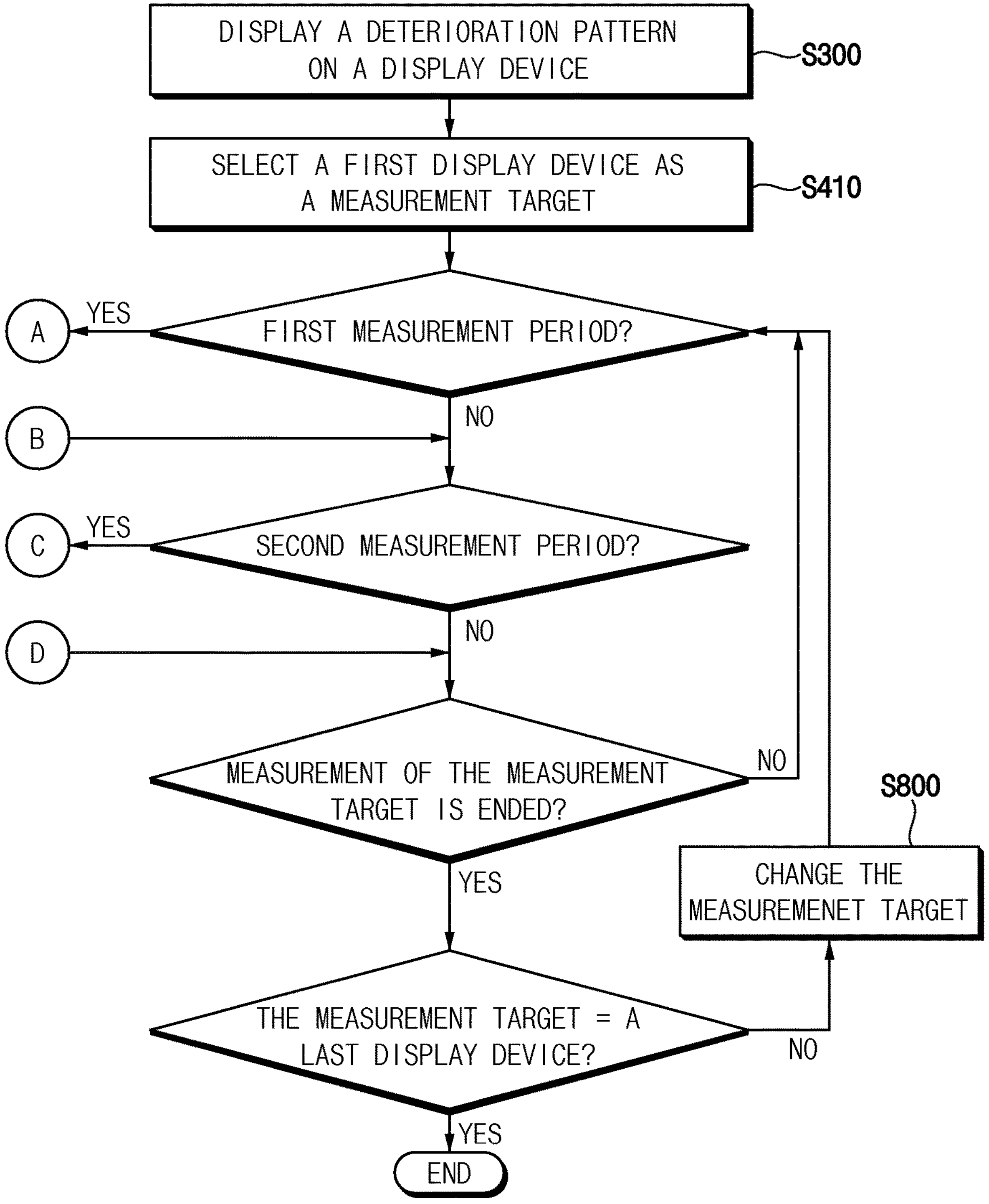
Figure 7:
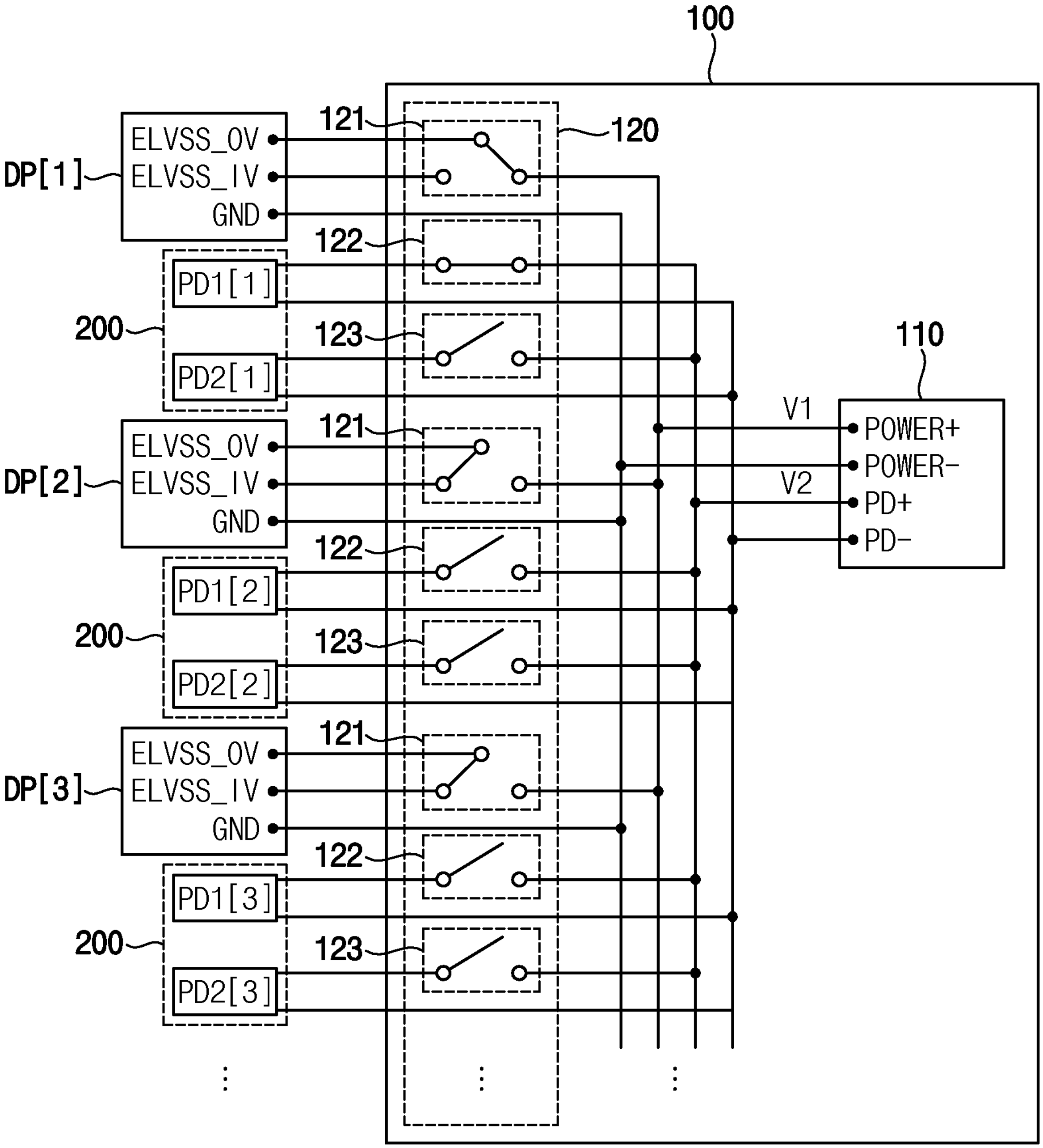
FIGS. 7 and 8 are diagrams illustrating an example in which a first display device is a measurement target in a first measurement period according to the measurement method of the measurement device of FIG. 3, according to some embodiments of the present disclosure.
Figure 8:
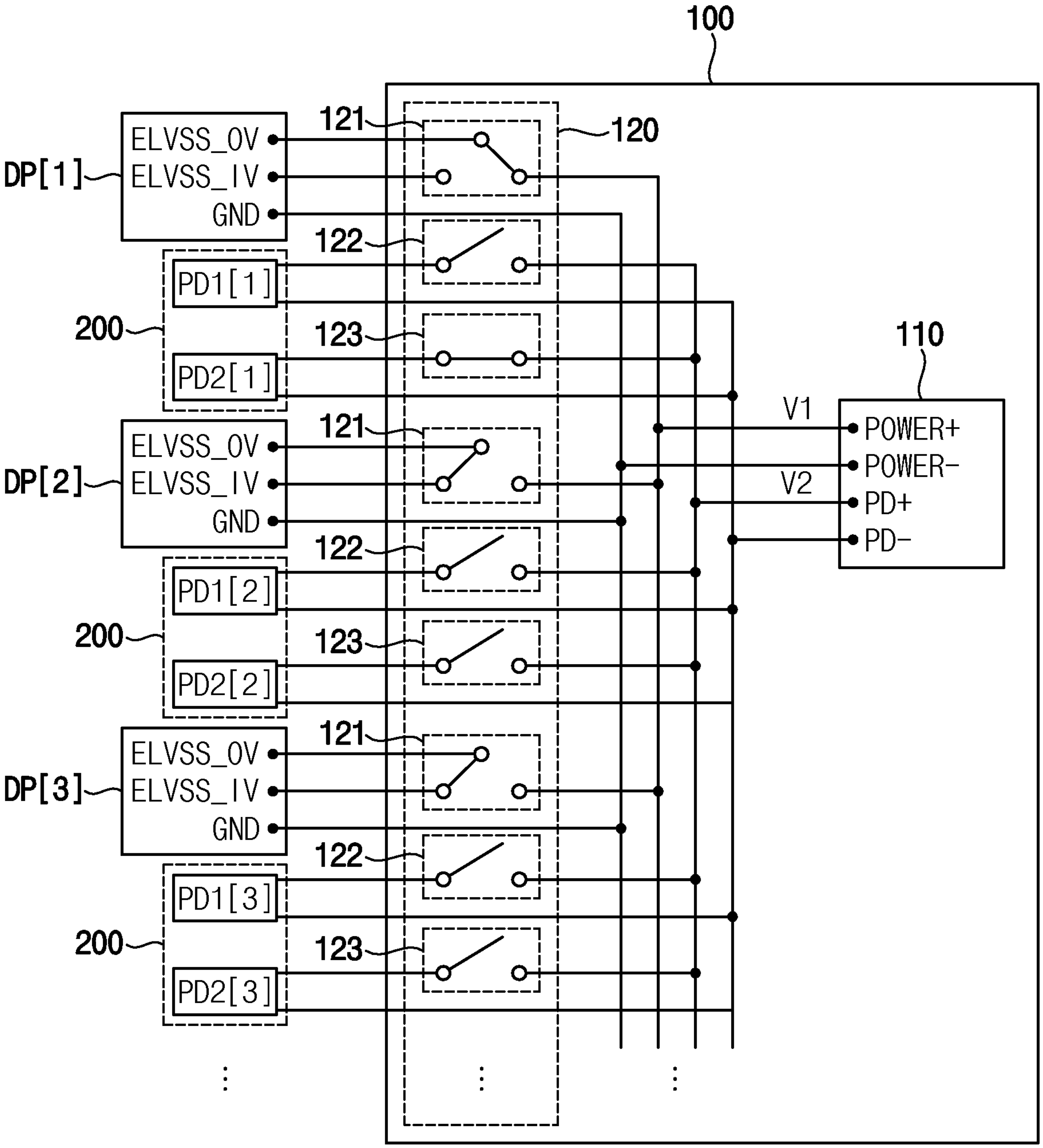
Figure 9:
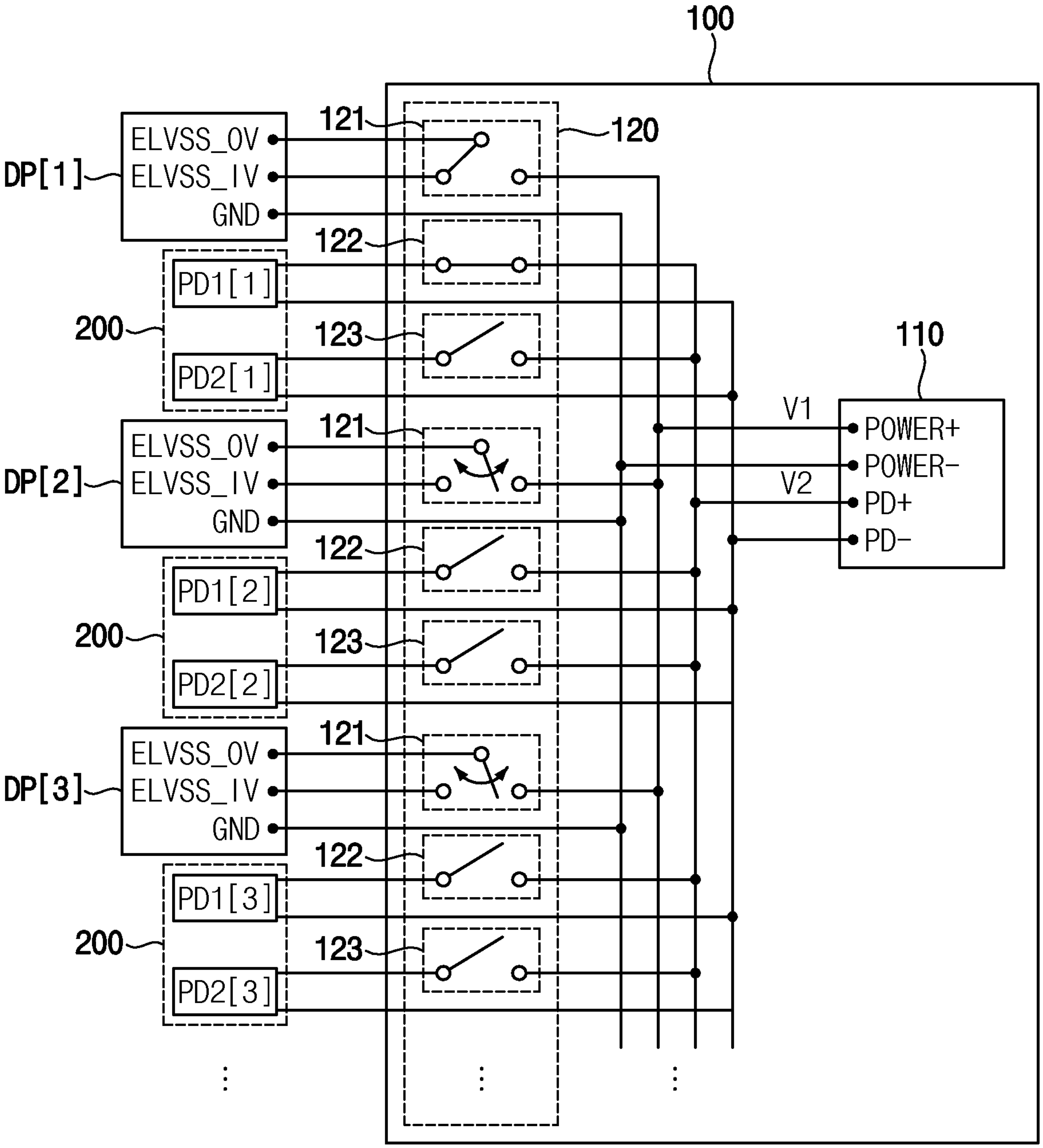
FIGS. 9 and 10 are diagrams illustrating an example in which a first display device is a measurement target in a second measurement period according to the measurement method of the measurement device of FIG. 3, according to some embodiments of the present disclosure.
Figure 10:
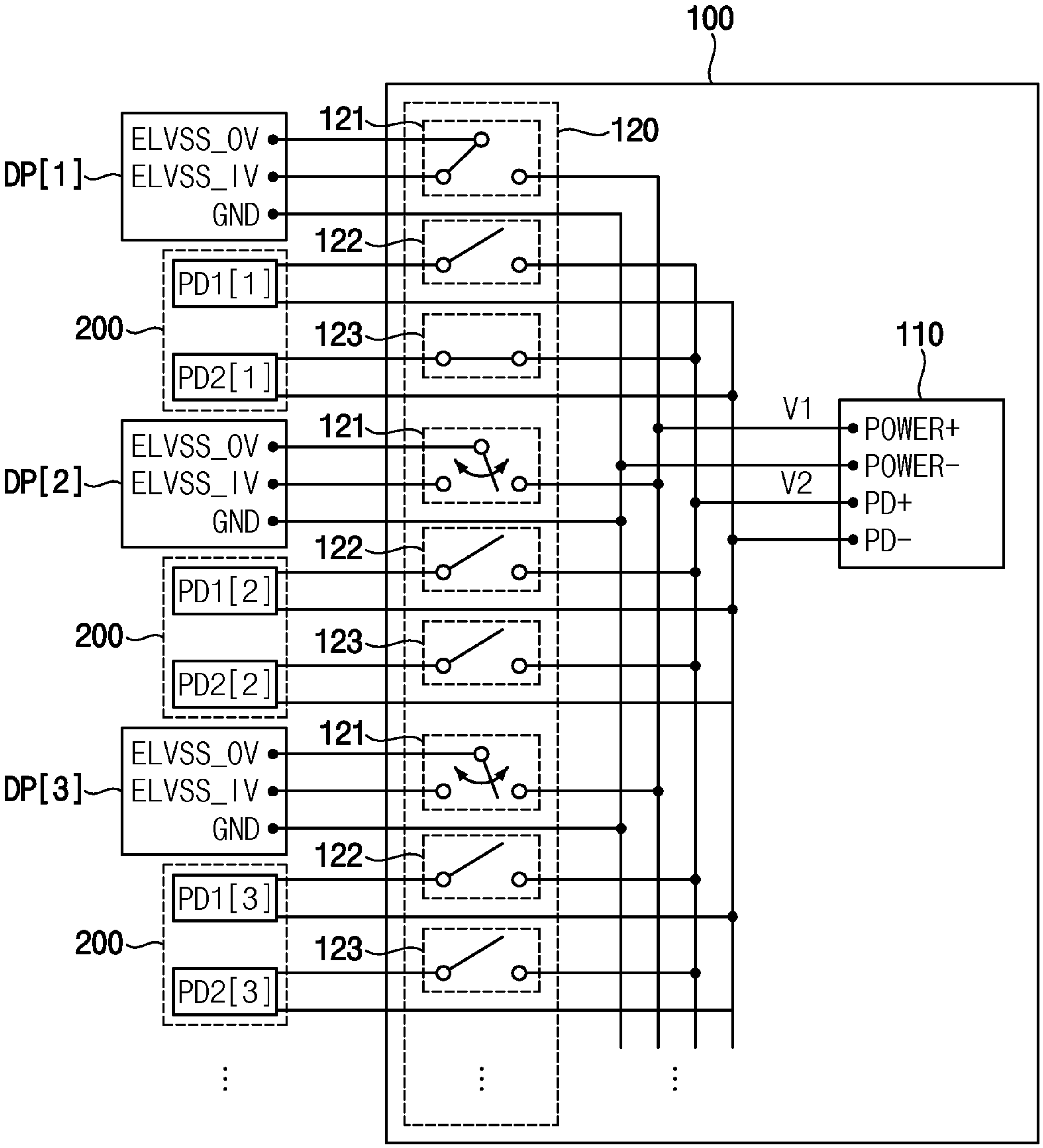
Figure 11:
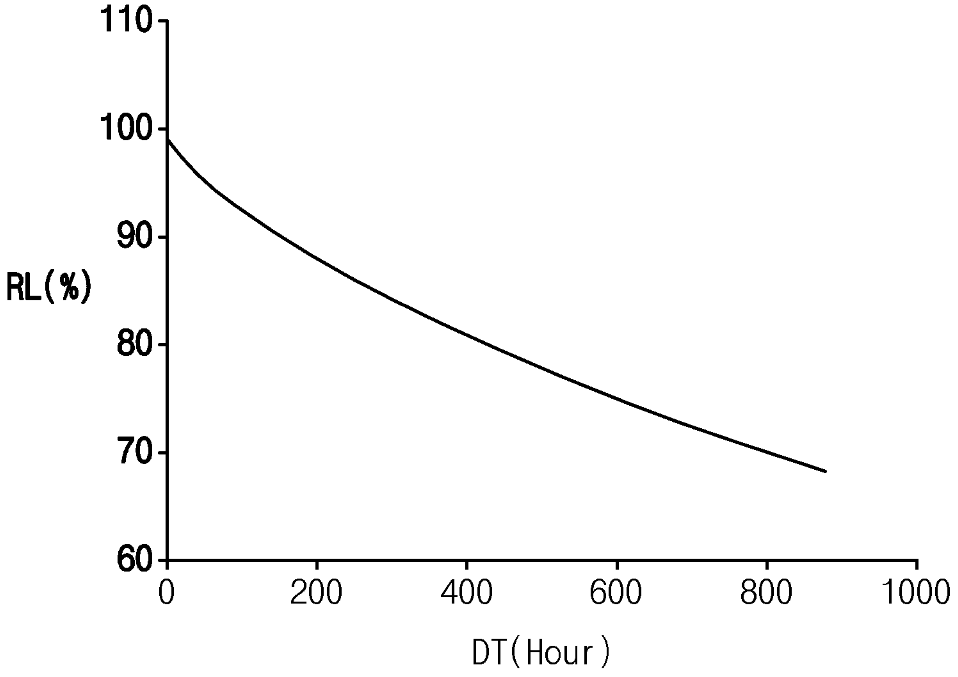
FIG. 11 is a graph illustrating a luminance ratio as a function of deterioration time, according to some embodiments of the present disclosure.
Figure 12:
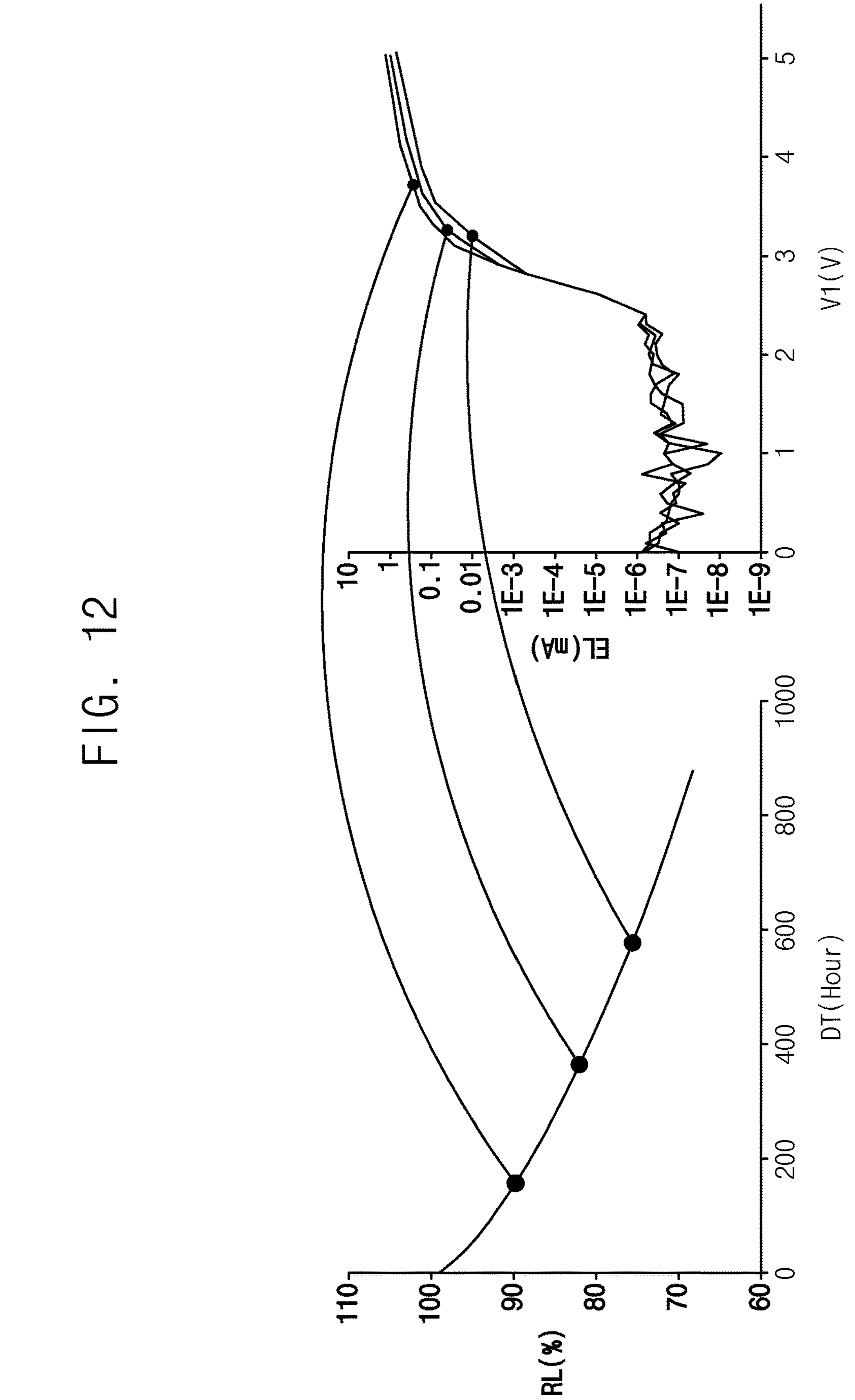
FIG. 12 is a graph illustrating a voltage-current characteristic as a function of deterioration time, according to some embodiments of the present disclosure.
Figure 13:
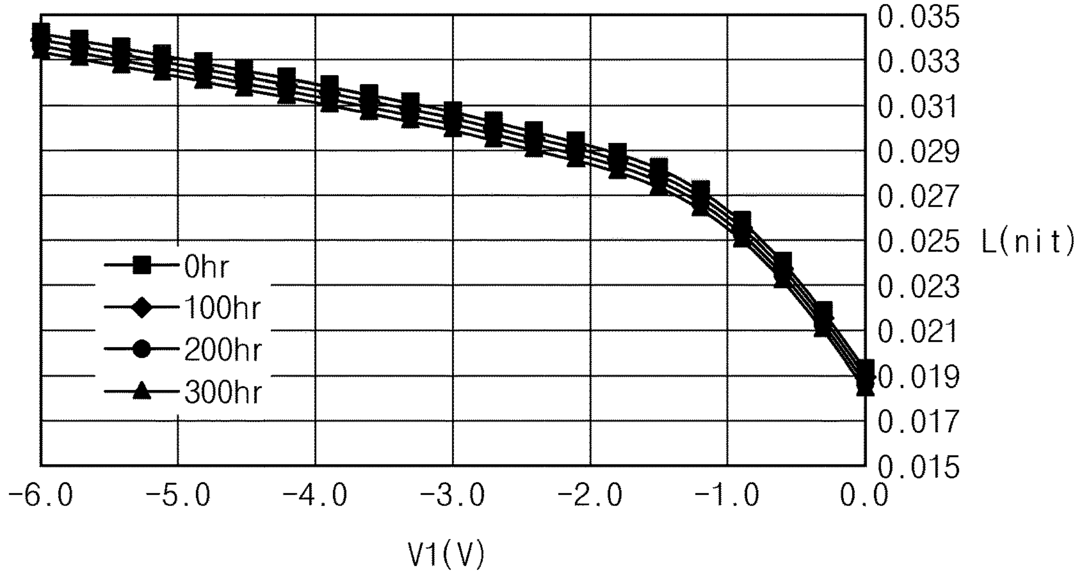
FIG. 13 is a graph illustrating a luminance according to a first power voltage, according to some embodiments of the present disclosure.

FIGS. 6A and 6B are flowcharts illustrating an example of measurement of a power current and a luminance according to the measurement method of the measurement device of FIG. 3, according to some embodiments of the present disclosure. FIGS. 7 and 8 are diagrams illustrating an example in which a first display device DP[1] is a measurement target in a first measurement period according to the measurement method of the measurement device of FIG. 3, according to some embodiments of the present disclosure. FIGS. 9 and 10 are diagrams illustrating an example in which a first display device DP[1] is a measurement target in a second measurement period according to the measurement method of the measurement device of FIG. 3, according to some embodiments of the present disclosure. FIG. 11 is a graph illustrating a luminance ratio RL as a function of deterioration time DT, according to some embodiments of the present disclosure. FIG. 12 is a graph illustrating a voltage-current characteristic as a function of deterioration time DT, according to some embodiments of the present disclosure. FIG. 13 is a graph illustrating a luminance L according to a first power voltage V1, according to some embodiments of the present disclosure. FIG. 14 is a graph illustrating a first measurement period MP1 and a second measurement period MP2, according to some embodiments of the present disclosure.

In FIG. 14, a first measurement period MP1 may be a period in which the initial power current is measured, and a first second measurement period MP2 may be a period in which the initial luminance is measured by using the internal voltage.

Referring to FIGS. 1 and 5 to 8, the measurement method of the measurement device, as illustrated in FIG. 3, may include: selecting the first display device as the measurement target (S410; see FIG. 6B); setting, upon the first measurement period, the first power voltage V1 to the initial value (S420; see FIG. 6A); providing the first power voltage V1 to the display device that is the measurement target (S430); measuring a power current, the first power voltage V1, and a luminance of the display device that is the measurement target (S510); and increasing, when the first power voltage V1 does not have (e.g., is not equal to) the final value, the first power voltage V1 (S520), providing the first power voltage V1 to the display device that is the measurement target again, and measuring the power current, the first power voltage V1, and the luminance of the display device that is the measurement target (S510).

For example, as shown in FIG. 7, in the first measurement period in which the power current of the first display device DP[1] is measured, the first switch 121 connected to the first display device DP[1] may connect the power terminal ELVSS_OV of the first display device DP[1] to the first terminal POWER+ of the power supplier 110. In addition, the first switch 121 connected to each of the display devices (e.g., the second and third display devices DP[2] and DP[3]), except for the first display device DP[1], may connect the power terminal ELVSS_OV to the internal voltage terminal ELVSS_IV.

For example, as shown in FIG. 7, in the first measurement period in which the power current of the first display device DP[1] is measured, when the luminance of the first display region DA1 of the first display device DP[1] is measured, the second switch 122 connected to the first luminance sensor PD1[1], which is configured to measure the luminance of the first display region DA1 of the first display device DP[1], may be turned on, and the third switch 123 connected to the second luminance sensor PD2[1], which is configured to measure the luminance of the second display region DA2 of the first display device DP[1], may be turned off. In addition, the second and third switches 122 and 123 connected to each of the display devices (e.g., the second and third display devices DP[2] and DP[3]), except for the first display device DP[1], may be turned off.

For example, as shown in FIG. 8, in the first measurement period in which the power current of the first display device DP[1] is measured, when the luminance of the second display region DA2 of the first display device DP[1] is measured, the third switch 123 connected to the second luminance sensor PD2[1], which is configured to measure the luminance of the second display region DA2 of the first display device DP[1], may be turned on, and the second switch 122 connected to the first luminance sensor PD1[1], which is configured to measure the luminance of the first display region DA1 of the first display device DP[1], may be turned off. In addition, the second and third switches 122 and 123 connected to each of the display devices (e.g., the second and third display devices DP[2] and DP[3]), except for the first display device DP[1], may be turned off.

Referring to FIGS. 1, 5, 6A, 6B, 9, and 10, the measurement method of the measurement device, as illustrated in FIG. 3, may include: providing, upon the second measurement period, the internal voltage of the display device that is the measurement target to the display device that is the measurement target (S610); displaying a measurement pattern on the display device that is the measurement target (S620); and measuring the luminance of the display device that is the measurement target (S710).

For example, as shown in FIG. 9, in the second measurement period in which the luminance of the first display device DP[1] is measured, the first switch 121 connected to the first display device DP[1] may connect the power terminal ELVSS_OV of the first display device DP[1] to the internal voltage terminal ELVSS_IV of the first display device DP[1].

For example, as shown in FIG. 9, in the second measurement period in which the luminance of the first display device DP[1] is measured, when the luminance of the first display region DA1 of the first display device DP[1] is measured, the second switch 122 connected to the first luminance sensor PD1[1], which is configured to measure the luminance of the first display region DA1 of the first display device DP[1], may be turned on, and the third switch 123 connected to the second luminance sensor PD2[1], which is configured to measure the luminance of the second display region DA2 of the first display device DP[1], may be turned off. In addition, the second and third switches 122 and 123 connected to each of the display devices (e.g., the second and third display devices DP[2] and DP[3]), except for the first display device DP[1], may be turned off.

For example, as shown in FIG. 10, in the second measurement period in which the luminance of the first display device DP[1] is measured, when the luminance of the second display region DA2 of the first display device DP[1] is measured, the third switch 123 connected to the second luminance sensor PD2[1], which is configured to measure the luminance of the second display region DA2 of the first display device DP[1], may be turned on, and the second switch 122 connected to the first luminance sensor PD1[1], which is configured to measure the luminance of the first display region DA1 of the first display device DP[1], may be turned off. In addition, the second and third switches 122 and 123 connected to each of the display devices (e.g., the second and third display devices DP[2] and DP[3]), except for the first display device DP[1], may be turned off.

The measurement method of the measurement device, as illustrated in FIG. 3, may include determining whether the measurement of the display device that is the measurement target is ended when a period is not the first measurement period or the second measurement period. In addition, the measurement method of the measurement device, as illustrated in FIG. 3, may include determining again whether the period is the first measurement period or the second measurement period when the measurement of the display device is not ended. As described above, when the measurement of the display device that is the measurement target is not ended, the display device may continuously display the deterioration pattern. However, the measurement method of the measurement device, as illustrated in FIG. 3, may include determining whether the measurement target is the last display device when the measurement of the display device is ended.

The measurement method of the measurement device, as illustrated in FIG. 3, may include ending the measurement when the measurement target is the last display device. According to some embodiments, the measurement method of the measurement device, as illustrated in FIG. 3, includes selecting the first display device as the measurement target again when the measurement target is the last display device. Accordingly, the measurement of the display devices may be repeatedly performed.

The measurement method of the measurement device, as illustrated in FIG. 3, may include changing, when the measurement target is not the last display device, the measurement target (S800). The measurement device may sequentially (e.g., serially) perform measurement on the display devices DP[1], DP[2], and DP[3]. Therefore, the display devices DP[1], DP[2], and DP[3] may be sequentially (e.g., serially) selected as the measurement target, and the selection may be repeatedly performed until the measurement target becomes the last display device.

Referring to FIGS. 5 and 11, the measurement device may measure a variation in luminance as a function of deterioration time DT. For example, the measurement device may measure a luminance ratio RL between the first display region DA1 and the second display region DA2 according to the deterioration time DT. For example, a user may measure the luminance ratio RL from the luminosities of the first display region DA1 and the second display region DA2 by using the measurement device.

The deterioration time DT may be a cumulative time in which the deterioration pattern DPA is displayed. The luminance ratio RL may be a ratio of the luminance of the first display region DA1 to the luminance of the second display region DA2.

As described above, the second display region DA2 may not deteriorate. In other words, the luminance of the second display region DA2 measured in the second measurement period may be greater than the luminance of the first display region DA1. Therefore, a difference between the luminance of the first display region DA1 and the luminance of the second display region DA2 may be gradually increased as the deterioration time DT increases, and the luminance ratio RL may represent the variation in the luminance according to the deterioration time DT.

Referring to FIG. 12, according to the measurement method of the measurement device, as illustrated in FIG. 3, a voltage-current characteristic according to the deterioration time DT may be measured. The voltage-current characteristic of the display device may be the power current EL according to the first power voltage V1.

As the display device deteriorates, the voltage-current characteristic of the display device may vary. The measurement device may measure the voltage-current characteristic according to the deterioration time DT by measuring the power current EL according to the first power voltage V1 after the display device deteriorates as a result of the deterioration pattern.

Referring to FIG. 13, the luminance L may be measured in the first measurement period. According to the measurement method of the measurement device, as illustrated in FIG. 3, the luminance L may be measured in the first measurement period as well as the second measurement period so that the variation in the luminance of the display device according to the deterioration time may be measured for the first power voltage V1 as well as the internal voltage. In addition, according to the measurement method of the measurement device, as illustrated in FIG. 3, the luminance L may be measured in the first measurement period so that the luminance L according to the first power voltage V1 may be measured.

Referring to FIG. 14, the first measurement period MP1 may be repeated at first measurement intervals, and the second measurement period MP2 may be repeated at second measurement intervals. For example, as shown in FIG. 14, the first measurement interval may be about 100 hours, and the second measurement interval may be about 1 hour. In other words, the voltage-current characteristic may be measured for each first measurement interval, and the luminance ratio RL may be measured for each second measurement interval.

According to some embodiments, the initial power current is measured before the initial luminance measured by using the internal voltage. As shown in FIG. 14, when the display device is driven according to the first power voltage (i.e., the first measurement period MP1) and measures the luminance by using the internal voltage (i.e., the second measurement period MP2), a high luminance ratio RL may be measured. The luminance ratio RL according to the initial luminance measured by using the internal voltage may be set as a reference, which is 100%. Therefore, to prevent the luminance ratio RL from exceeding 100%, the initial power current may be measured before the initial luminance measured by using the internal voltage.

Although the first measurement period has been illustrated in the present embodiment as preceding the second measurement period, the present disclosure is not limited to an order of the first measurement period and the second measurement period. For example, unlike FIGS. 4 and 7, the first measurement period may follow the second measurement period.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of some embodiments of the present disclosure, and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined by the claims, and equivalents thereof. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims and equivalents thereof.

What is claimed is:

1. A measurement device comprising:

a power supplier comprising a first terminal through which a first power voltage is output and a second terminal through which a second power voltage is output, the power supplier being configured to receive a first current from the first terminal to measure a power current of a display device and to receive a second current from the second terminal to measure a luminance of the display device;

a switching circuit comprising a first switch configured to selectively connect a power terminal of the display device to the first terminal or an internal voltage terminal of the display device through which an internal voltage of the display device is output; and a luminance sensing circuit configured to receive the second power voltage and to generate the second current corresponding to the luminance of the display device, wherein the power supplier is configured to measure the power current in a first measurement period and to measure the luminance in a second measurement period, wherein the first measurement period is repeated at a rate less than a repetition rate of the second measurement period.

2. The measurement device of claim 1, wherein the first switch is configured to connect the power terminal to the first terminal in a first measurement period in which the power current is measured.

3. The measurement device of claim 1, wherein the power supplier is configured to vary the first power voltage and to measure the power current according to the first power voltage.

4. The measurement device of claim 1, wherein the first switch is configured to connect the power terminal to the internal voltage terminal in a second measurement period in which the luminance is measured.

5. The measurement device of claim 1, wherein the first switch comprises a reed switch.

6. The measurement device of claim 1, wherein the luminance sensing circuit comprises:

a first luminance sensor configured to generate the second current corresponding to a luminance of a first display region of the display device; and a second luminance sensor configured to generate the second current corresponding to a luminance of a second display region of the display device, which is different from the first display region of the display device.

7. The measurement device of claim 6, wherein the switching circuit further comprises:

a second switch configured to connect the second terminal to the first luminance sensor; and a third switch configured to connect the second terminal to the second luminance sensor.

8. The measurement device of claim 7, wherein each of the second and third switches comprises a reed switch.

9. A measurement device comprising:

a power supplier comprising a first terminal through which a first power voltage is output and a second terminal through which a second power voltage is output, the power supplier being configured to receive a first current from the first terminal to measure a power current of a display device and to receive a second current from the second terminal to measure a luminance of the display device;

a switching circuit comprising a first switch configured to selectively connect a power terminal of the display device to the first terminal or an internal voltage terminal of the display device through which an internal voltage of the display device is output; and a luminance sensing circuit configured to receive the second power voltage and to generate the second current corresponding to the luminance of the display device, wherein the power supplier comprises:

a control circuit configured to generate an initial power voltage;

a power amplifier configured to receive a sum of the initial power voltage and a feedback voltage and to output the first power voltage;

a current meter configured to measure the power current;

a voltage meter configured to measure the first power voltage at the first terminal;

a luminance meter configured to measure the luminance; and a feedback controller configured to generate the feedback voltage based on the initial power voltage and the first power voltage.

* * * * *